Jan. 31, 1950     B. F. KIESEL     2,495,848
SPRING CLIP
Filed April 6, 1948
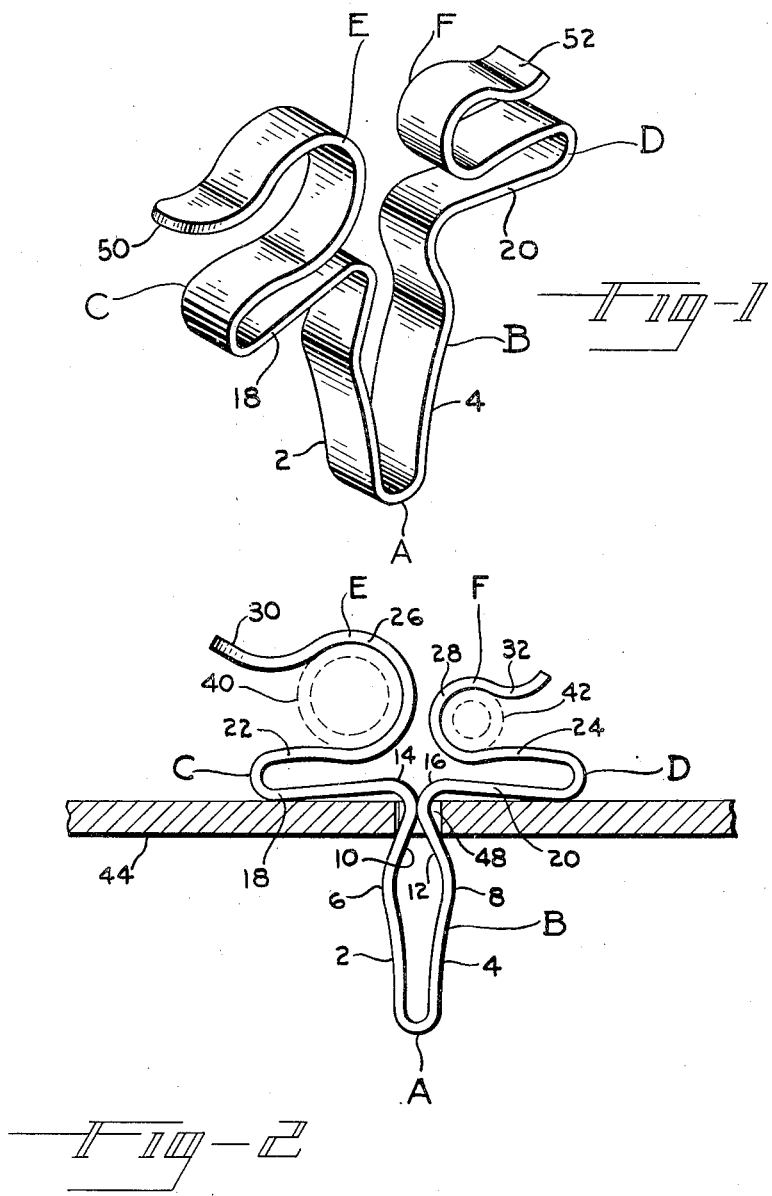
INVENTOR.
BERNHARD F. KIESEL
BY
Scrivener & Parker
ATTORNEY Patented Jan. 31, 1950

2,495,848

UNITED STATES PATENT OFFICE 2,495,848

SPRING CLIP

Bernhard F. Kiesel, Detroit, Mich., assignor of one-half to Bertha K. Kiesel

Application April 6, 1948, Serial No. 19,270

2 Claims. (Cl. 24—81)

This invention relates to tubing clips which are devices widely used in automobile and other manufacturing operations to attach tubing, wires, rods or other similar parts to some supporting member such as a chassis or body member. In general, clips of this type are formed of spring strip metal and have a part which snaps into a hole in the chassis or body member to quickly attach it to the same and another part into which the tubing or like device is snapped. The spring clip device thus serves as a cheap and efficient means for quickly, easily and detachably attaching the tubing or like device to the chassis or body member.

My invention has to do with clips of the described type and has resulted in the provision of such a clip which, although a unitary device of simple and inexpensive structure, will accommodate two tubing or similar elements which may be of the same or different diameters, whereby the number of clips required, the number of holes required in the supporting member, and the labor incident to installation of the clips and tubing are all materially reduced. A further important result and feature of my invention has been the provision of a clip which is so constructed and operable that by placing one or both of the tubing elements in fastened position therein such stresses are produced in the parts and members of the clip that they engage and grasp the supporting structure more firmly, whereby the strength and rigidity of the connection of the tubing to the support is increased by merely placing one or both tubing elements in attached position in the clip.

These and other results, objects and features of my invention will be made apparent by the following description and the annexed drawing which disclose a preferred embodiment of the invention, but one which is only illustrative of other embodiments which may be made.

In the drawings forming part of this application,

Fig. 1 is a perspective view of a clip formed according to this invention, and

Fig. 2 shows, in plan and sectional view, the clip of Fig. 1 attaching two tubing elements to a supporting structure.

The clip illustrated in the drawings is formed by bending a single, narrow strip or ribbon of spring metal of uniform width at, or adjacent, its mid-point A to provide a bend of relatively small radius, from which the two arms of the strip diverge as at 2, 4 to opposite shoulders 6, 8, from which they converge as at 10, 12 to spaced, opposite points 14, 16. This part of the strip thus forms a generally diamond-shaped device B, the diverging sides 2, 4 of which are preferably longer than the converging sides 10, 12, and which has a rounded, narrow nose at A.

From the opposite, spaced parts 14, 16 the two parts of the strip are bent outwardly and slightly toward nose A as shown at 18, 20 and is then doubled back on itself in a direction away from nose A as shown at 22, 24 to form two outwardly and downwardly (i. e. toward the nose A) extending, elongated, resilient arms C, D. Each of the parts 22, 24 is then curved back on itself, in a direction away from nose A, on the arc of a circle through more than half of the circumference of the circle, as shown at 26, 28, to form on each side of the clip an outwardly facing opening, these being shown at E, F. The outer ends 30, 32 of the strip are curved upwardly and away from parts 22, 24 to provide with such parts an entrance opening into the recess formed by curved parts 26, 28. In a preferred embodiment of the invention, the curved parts 26, 28 are different in size, i. e. formed as the arcs of circles of different radii, as shown in the drawings, in order to accommodate tubing or like elements of different diameters. They may, of course, be of the same size.

The described clip is used to attach two tubing parts 40, 42, which may be separate tubes or may be parts of a single bent length of tubing, to a supporting structure 44, which may be an automobile body or chassis member and which has a hole 48 therein of less diameter than the distance between shoulders 6, 8 when the parts are not deformed or stressed. To effect such attachment the diamond-shaped part B of the clip is inserted into the hole 48 with the nose A first, and is pushed through the hole until the arms C, D stop further movement by abutting the upper surface of the supporting member 44. In this condition or position the shoulders 6, 8 are below the supporting member, i. e. they are on the side thereof opposite the arms C, D, the arms 10, 12 are in engagement with the lower edge of the hole 48, the outer ends of arms C, D are in engagement with the upper surface of the supporting member, the arms 2, 6 of the diamond-shaped part of the clip are flexed toward the arms 4, 8 thereof whereby these arms bear outwardly against the wall of opening 48 and tightly and resiliently attach the clip to the supporting member, the points 14, 16 of the diamond-shaped part B of the clip abut each other, and the parts 26, 28 which form the tubing-receiving apertures are in close proximity but preferably do not actually touch each other. Because of the convergence of arms 10, 12 of the diamond-shaped part of the clip, these arms will exert forces on the lower surface of the supporting member in an upward direction, while the outer ends of arms C, D will exert forces on the upper surface of the supporting member in the opposite direction, i. e. downwardly. These forces, opposing each other and acting on opposite faces of the supporting member will have the effect of tightly clamping the supporting member between the arms 10 and C on one side of the clip and the arms 12 and D on the other side. The parts 14 and 16, which connect the parts 10, 18 and 12, 20 respectively, abut and will be flexed when the clip is in assembled position, thus preventing the clip from tilting when the tubing is inserted, and also insuring that the parts engaging the opposite faces of the supporting members will bear thereon in the described manner.

When the clip is attached to the supporting member the tubing elements 40, 42 may be attached to the clip by snapping each of the tubular elements into one of the recesses E, F. To permit this, and to cause the tubing elements to be firmly but resiliently held in their respective recesses, the end parts 30, 32 which respectively overly the tubing recesses are brought toward the arms 22, 24, respectively, sufficiently that the entrances into the tubing recesses which are thus provided are of less dimension than the diameters of the tubes which fit within the recesses formed by the arcuate parts 26, 28. As stated hereinbefore, the tubing recesses may be of the same size or may be of different sizes as shown in the drawings.

When the tubing element 40 is pushed within its recess E in the described manner, the arms 22, 30 which form the upper and lower parts of the tubing recess will be flexed outwardly, i. e. away from each other. This flexure of arm 22 will have the effect of increasing the force with which the connected arm 18 bears on the upper surface of the supporting member 44, thus increasing the rigidity with which the clip is held to the supporting member. The same effect will, of course, occur when the tubing element 42 is inserted into recess F on the oppositee side of the clip.

As clearly shown in Fig. 1, one terminal end 50 of the spring metal strip is curved, while the other end 52 is not curved and is preferably formed as a straight edge extending at right angles to the longitudinal center line of the ribbon or strip. The purpose of this is to permit the workman who is assembling tubing into the clip to readily tell which side of the clip has the large tubing recess and which has the small recess. Obviously, other means of differentiation than the curved and straight ends disclosed may be used to tell one side of the clip from the other.

While I have disclosed certain embodiments of my invention, it will be apparent to those skilled in the art that other embodiments, as well as modifications thereof, may be made without departing in any way from the spirit or scope of the invention for the limits of which reference must be had to the appended claims.

What is claimed is:

1. A snap fastener device for attaching two tubing or similar elements to a perforated supporting structure, said device being formed from a single narrow strip of spring metal of uniform width and comprising a part adapted to be inserted substantially entirely through a perforation in said supporting structure and being formed by bending the central part of the strip to provide a nose and parts diverging from the nose, parts converging from the ends of said diverging parts and adapted to be positioned within one of said perforations and to resiliently engage the lower surface of the supporting structure when said part is passed through the perforation into assembled position, two tubing-receiving parts adapted to be positioned on the opposite side of the supporting structure from the nose and other parts which are inserted through the perforation therein and being formed by bending the strip between the ends thereof and the adjacent ends of the converging arms to provide two oppositely-facing, outwardly and laterally opening tubing receiving parts, and means formed by bending the strip between each of said converging parts and the adjacent tubing-receiving part to provide a pair of elongated resilient arms which extend laterally and outwardly in opposite directions, the outer ends of said arms resiliently engaging the upper surface of the supporting structure when the clip is in assembled position.

2. A snap fastener device for attaching two tubing or similar elements to a perforated supporting member, comprising a strip of spring metal bent adjacent its central part to form a nose, parts diverging from the nose and parts converging from the ends of the diverging paths to provide a generally diamond-shaped part adapted to be pushed through one of the perforations from one side of the supporting member, the strip being bent outwardly and toward the nose from the end of each of the converging parts and then back upon itself to provide laterally extending elongated arms, the outer ends of which engage the surface of the supporting member at the side thereof from which the diamond-shaped part is inserted when the fastener is in assembled position, and the part of the strip between the arms and an end of the strip being bent inwardly on the arm of a circle to provide an outwardly-opening tubing-receiving recess.

BERNHARD F. KIESEL.

REFERENCES CITED

The following references are of record in the file of this patent:

UNITED STATES PATENTS

| Number | Name | Date |
| --- | --- | --- |
| 2,061,463 | Hall | Nov. 17, 1936 |
| 2,174,447 | Place | Sept. 26, 1939 |
| 2,453,980 | Hartman | Nov. 16, 1948 |